Patented Oct. 11, 1949

2,484,791

UNITED STATES PATENT OFFICE 2,484,791

PURIFICATION OF N¹-SUBSTITUTED SULFANILAMIDES

Victor L. King, Bound Brook, and Edward H. Bart, Elizabeth, N. J., assignors to American Cyanamid Company, New York, N. Y., a corporation of Maine No Drawing. Application August 24, 1944, Serial No. 551,056

2 Claims. (Cl. 260—239.6)

This invention relates to an improved process of purifying N¹-substituted sulfanilamides. More particularly it relates to a process whereby sulfonamide derivatives such as sulfaguanidine, sulfapyridine, sulfadiazine and the like may be prepared in a form presenting a more satisfactory color.

In recent years the production of N¹-substituted sulfanilamides as intermediates in the production of dyes having a high degree of light fastness and of pharmaceutical preparations has become of great importance. For both purposes, but particularly in the pharmaceutical field, absence of colored impurities is essential. In small scale production in the laboratory, using glass equipment and extremely pure reagents, this is quite readily accomplished. When transferred to plant scale, however, certain difficulties arise which lead to the presence in the finished product of small traces of colored metal salts such as those of iron. The amounts present are very small but of a color readily perceptible to the eye.

It has been found that the principal sources of objectionable staining are traces of certain metals such as iron and the like which produce colored complexes with the sulfonamides. In large scale production it is substantially impossible to prevent traces of these metals such as iron and the like from being present in the solutions being treated. Their presence may be due to one or more of several causes. Sulfuric acid, which is used at several stages in the process, is substantially impossible to obtain in a completely iron-free condition. The same is true of caustic soda and other alkalies used in the processes. There are also usually present in the intermediates, for example, the acetylsulfanilyl chloride, a certain amount of iron salts. Their presence is largely due to the necessary use of metal equipment and the fact that corrosion problems are always serious in this work. For the same reason, in the preparation of the sulfonamides themselves, in the normal course of which some of the materials may be handled in metallic vessels, certain traces of metal salts are picked up.

It is, therefore, the principal object of the present invention to devise a process whereby these sulfonamide derivatives may be prepared substantially free from such stains. It is also an object to provide a process which is relatively simple, effective in operation, adapted to plant use and not interfering with the desirable properties of the ultimate product.

In general, the desired objects of the present invention are accomplished by adding to the materials being processed at some stage prior to the final crystallization, a material capable of forming a water-soluble complex with the metals, thereby eliminating the source of color. The materials should form a metallic complex of sufficient solubility to prevent the formation of any appreciable insoluble metal complex of the sulfonamide derivatives. Obviously the complex-forming material must itself be water-soluble.

It has been found that this complex-forming material may be quite widely varied. Among the useful materials which have been found to be operable are such organic hydroxy acids as tartaric acid, gluconic acid and the like, polyhydroxy alcohols such as mannitol and sorbitol and sugars such as sucrose, cerelose, and the like. It will be noted that these compounds have several common characteristics. They possess two or more hydroxy groups, they are all water-soluble, and they all form highly water-soluble complexes with iron salts.

Addition of the complex-forming materials may be at varied points in the purification of the crude sulfonamide products. The latter are ordinarily given a number of recrystallizations, usually also including at least one treatment with decolorizing carbon. Preferably the complex-forming materials are added after the treatment with the decolorizing carbon, the product then being crystallized, filtered, washed and finally dried.

The amount added need not be large since the amount of metal to be removed thereby as a soluble complex is quite small in all ordinary operations. Under normal conditions amounts ranging from 0.1–1.0% of the weight of material being purified may be required. Under ordinary conditions, however, a good practice is the addition of about 0.5% of the weight of the sulfonamides. This amount will take care of all but the extraordinary cases and being water-soluble any excess is readily removed.

The invention will be more fully illustrated in conjunction with the following examples which are to be taken as illustrative only and not by way of limitation. All parts are by weight unless otherwise noted.

Example 1

Five hundred fifty parts of crude sulfaguanidine was dissolved in 5500 parts of boiling water. 45 parts of activated charcoal was added and the hot solution clarified through a filter press. Two parts of mannitol were added to the hot filtered solution. The solution was cooled and the crystallized sulfaguanidine filtered off at 15° C., washed salt-free and dried. The resulting sulfaguanidine was whiter and contained less iron than batches made without the addition of mannitol. Repetitions of the test showed the same improvement in quality is obtained using 2 parts of cerelose, tartaric acid, gluconic acid or sucrose, in place of the mannitol.

*Example 2*

400 parts of crude sulfadiazine was dissolved by addition of a base in 3450 parts of water and the solution heated to 75-80° C. 50 parts of activated charcoal suspended in 200 parts of water were added and the mixture was agitated for 30 minutes. The hot solution was clarified through a filter press. 2 parts of mannitol were dissolved in the clear filtrate. The volume was adjusted to 4400 parts by volume and the temperature to 70° C. On acidifying the hot solution to the isoelective point, the sulfadiazine precipitated as a pure white product. It was filtered off, washed salt-free, and dried. The resulting pure sulfadiazine was whiter and contained less iron by analysis than batches made without the addition of mannitol. The same improvement in the quality was obtained through the use of 2 parts of cerelose, sucrose or gluconic acid in place of the mannitol.

We claim:

1. In the purification and decolorization of a crude $N^1$-substituted sulfanilamide contaminated with traces of colored metallic salts, the improvement which comprises forming an aqueous solution of said crude substituted sulfanilamide, adding to said solution a water-soluble, polyhydroxy compound selected from the group consisting of cerelose, sucrose, mannitol, sorbitol, tartaric acid, and gluconic acid, and precipitating and collecting said substituted sulfonamide from said aqueous solution, the weight of polyhydroxy compound added being between 0.1 and 1.0% of the weight of the crude substituted sulfanilamide.

2. The process according to claim 1 wherein the polyhydroxy compound is mannitol.

VICTOR L. KING.
EDWARD H. BART.

REFERENCES CITED

The following references are of record in the file of this patent:

UNITED STATES PATENTS

| Number | Name | Date |
| --- | --- | --- |
| 2,167,719 | Klengel et al. | Aug. 1, 1939 |
| 2,259,222 | Ewins | Oct. 14, 1941 |
| 2,276,664 | Mietzsch et al. | Mar. 17, 1942 |
| 2,281,014 | Winnek | Apr. 28, 1942 |
| 2,301,000 | Winnek | Nov. 3, 1942 |
| 2,358,031 | Roblin et al. | Sept. 12, 1944 |
| 2,362,087 | Newberry | Nov. 7, 1944 |

FOREIGN PATENTS

| Number | Country | Date |
| --- | --- | --- |
| 116,165 | Australia | Dec. 3, 1942 |
| 849,504 | France | Nov. 25, 1939 |

OTHER REFERENCES

Journal Amer. Chem. Soc., vol. 61, pp, 1198-1200 (1939).